US005780760A

United States Patent [19]

Riboloff

[11] Patent Number: 5,780,760

[45] Date of Patent: Jul. 14, 1998

[54] GUITAR PICKUP SWITCHING SYSTEM FOR THREE-PICKUP GUITAR

[75] Inventor: John T. Riboloff, Antioch, Tenn.

[73] Assignee: Gibson Guitar Corp., Nashville, Tenn.

[21] Appl. No.: 782,456

[22] Filed: Jan. 13, 1997

[51] Int. Cl.$^6$ .............................. G01H 1/08; G01H 1/46; G01H 3/18

[52] U.S. Cl. ................................ 84/726; 84/735; 84/741; 84/742

[58] Field of Search .............................. 84/726–728, 735, 84/736, 741, 742

[56] References Cited

U.S. PATENT DOCUMENTS

| | | | |
|---|---|---|---|
| 3,725,561 | 4/1973 | Paul | 84/1.15 |
| 3,902,394 | 9/1975 | Stich | 84/1.15 |
| 3,915,048 | 10/1975 | Stich | 84/1.14 |
| 3,916,751 | 11/1975 | Stich | 84/1.15 |
| 4,026,178 | 5/1977 | Fuller | 84/1.16 |
| 4,151,776 | 5/1979 | Stich | 84/1.16 |
| 4,164,163 | 8/1979 | Rhodes | 84/1.15 |
| 4,319,510 | 3/1982 | Fender | 84/1.15 |
| 4,408,513 | 10/1983 | Clevinger | 84/1.15 |
| 4,499,809 | 2/1985 | Clevinger | 84/1.15 |
| 4,581,974 | 4/1986 | Fender | 84/1.15 |
| 4,581,975 | 4/1986 | Fender | 84/1.15 |
| 5,136,918 | 8/1992 | Riboloff | 84/723 |
| 5,136,919 | 8/1992 | Wolstein | 84/742 |
| 5,311,806 | 5/1994 | Riboloff | 84/728 |
| 5,376,754 | 12/1994 | Stich | 84/728 |
| 5,438,158 | 8/1995 | Riboloff | 84/727 |

*Primary Examiner*—Stanley J. Witkowski
*Attorney, Agent, or Firm*—McAfee & Taft

[57] ABSTRACT

A guitar pickup switching system has a single-coil treble pickup, a single-coil middle pickup, and a single-coil rhythm pickup for an electric guitar. A switch arrangement allows the guitar player to select outputs of the pickups in any one of the following seven combinations: treble pickup output alone, treble pickup output plus middle pickup output, middle pickup output alone, middle pickup output plus rhythm pickup output, rhythm pickup output alone, treble pickup output plus rhythm pickup output, and treble pickup output plus middle pickup output plus rhythm pickup output. Two volume controls enable the player to vary the blend of treble pickup output and middle and rhythm pickup outputs provided from the switching system.

16 Claims, 2 Drawing Sheets

GUITAR PICKUP SWITCHING SYSTEM FOR THREE-PICKUP GUITAR

BACKGROUND OF THE INVENTION

This invention relates generally to guitar pickup switching systems particularly for electric guitars having three single-coil pickups.

Electric guitars (of whatever species, such as lead, bass, etc.) have one or more pickups with which electric signals are generated when the guitar is played. These signals are typically amplified and output through speakers to broadcast the music played.

There are various types of pickups, and there are various numbers and layouts of pickups on guitars. When more than one pickup is used, there are also various switching systems incorporating the pickups so that the pickups can be used in various configurations or combinations. That is, these switching systems enable the player to select which pickups are to provide their signals for amplification and broadcast at any particular time. Some of these systems, however, do not allow all possible combinations of the pickups to be selected or to be varied within a combination which has been selected.

Of particular relevance to the present invention is a three pickup layout. One example of this is the single-coil treble pickup, single-coil middle pickup, and single-coil rhythm pickup layout on a FENDER STRATOCASTER electric guitar. A conventional switching system with these pickups allows the following five combinations of pickups to be selected: treble pickup alone, treble pickup plus middle pickup, middle pickup alone, middle pickup plus rhythm pickup, and rhythm pickup alone. This switching system also has a single volume control for the system and two tone controls primarily for the middle and rhythm pickups. To enhance the versatility of a three-pickup layout, such as of the type on the STRATOCASTER guitar, there is the need for a guitar pickup switching system that enables all possible combinations of pickups to be selected, not just the five mentioned above. There is also the need for a guitar pickup switching system that has two volume control channels to enable volume control and blending of whichever pickup combination is selected.

SUMMARY OF THE INVENTION

The present invention meets the aforementioned needs by providing a novel and improved guitar pickup switching system. The present invention not only allows conventional pickup configurations to be selected by the guitar player, but it also enables all possible pickup configurations for a three-pickup layout to be selected. The present invention also provides for two separate volume control channels so that the player can vary the blend of pickups within a selected configuration.

The guitar pickup switching system of the present invention comprises a single-coil treble pickup, a single-coil middle pickup, and a single-coil rhythm pickup. The switching system further comprises switch means for selecting outputs of the pickups in any one of the following seven combinations: treble pickup output alone, treble pickup output plus middle pickup output, middle pickup output alone, middle pickup output plus rhythm pickup output, rhythm pickup output alone, treble pickup output plus rhythm pickup output, and treble pickup output plus middle pickup output plus rhythm pickup output.

The present invention also provides a guitar pickup switching system with the aforementioned pickups in combination with first volume control means for controlling volume of the output of the treble pickup and second volume control means for controlling volume of the outputs of the middle pickup and the rhythm pickup. These first and second volume control means are connected such that a single output comprising a selectable blend of treble pickup output and middle and rhythm pickup outputs is provided from the guitar pickup switching system.

The present invention also provides a guitar pickup switching system combining these pickups with both the switch means and the volume control means.

Therefore, from the foregoing, it is a general object of the present invention to provide a novel and improved guitar pickup switching system. Other and further objects, features and advantages of the present invention will be readily apparent to those skilled in the art when the following description of the preferred embodiments is read in conjunction with the accompanying drawings.

DETAILED DESCRIPTION OF THE INVENTION

Figure 1:
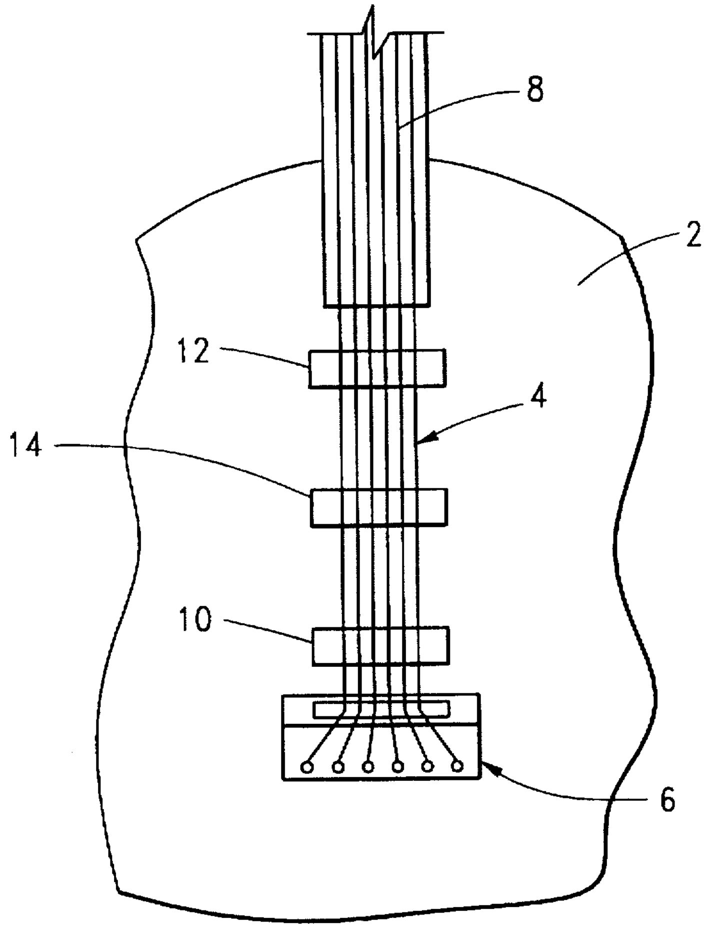
FIG. 1 is a representation of a part of an electric guitar with which the present invention can be used.

The present invention is for an electric guitar 2 such as partially illustrated in FIG. 1. The electric guitar 2 can be of any type (e.g., lead, bass) and of any brand, but regardless of such specifics the guitar 2 will have strings 4 (six are shown, but more or less can be used). The strings 4 are anchored at their lower ends (as viewed in FIG. 1) in conventional manner near a bridge 6 mounted on the body of the guitar 2. The strings 4 are connected at their upper ends to tuning screws (not shown) located at the upper end of a fingerboard 8 attached to or integrally formed with the main body of the guitar 2.

Within the foregoing generalities, the present invention is specifically for such a guitar having three single-coil pickups. These are represented in FIG. 1 as (1) single-coil treble pickup 10 typically mounted in conventional manner near the bridge 6 beneath the strings 4, (2) single-coil rhythm pickup 12 typically mounted in conventional manner near the fingerboard 8 beneath the strings 4, and (3) single-coil middle pickup 14 typically mounted in conventional manner between the pickups 10, 12 beneath the strings 4. A specific implementation of such pickups and their layout is as found on a conventional FENDER STRATOCASTER electric guitar.

Figure 2:
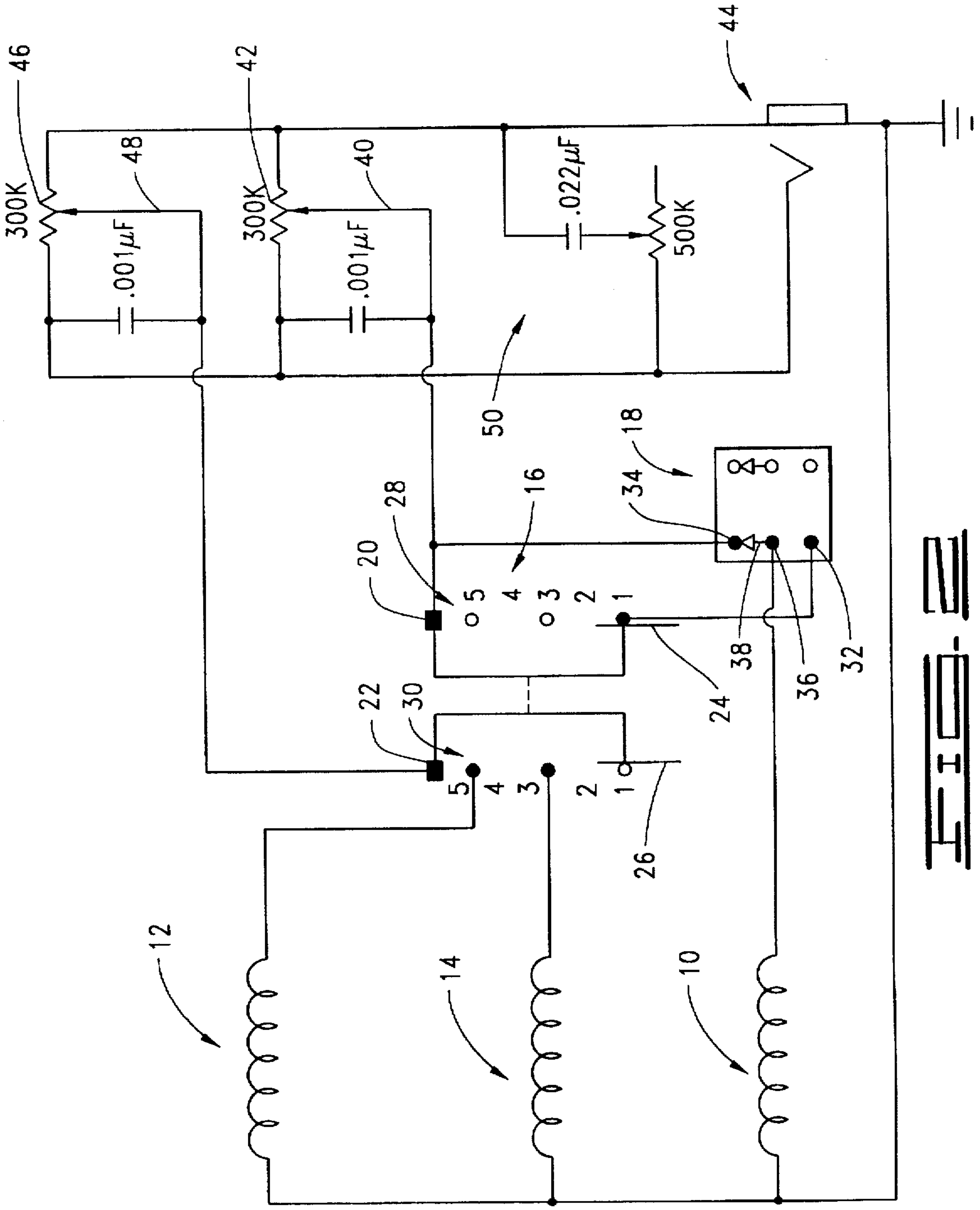
FIG. 2 is a schematic circuit diagram of the preferred embodiment of the guitar pickup switching system of the present invention.

Referring to FIG. 2, each of the pickups 10, 12, 14 is schematically represented simply by a respective single coil pictorial symbol; however, these pickups are actually complete units, such as having magnets, pole pieces, housings, etc., as known in the art. As shown in FIG. 2, one end of each coil or winding of the respective pickup is connected to electrical ground. The other ends of these windings are connected as described below. The term "connected" as used below and in the claims refers to electrical connections; however, all of the components shown in FIG. 2 are also mechanically connected in that they are all mounted in a suitable manner on the body of the guitar 2.

Each of the aforementioned other ends of the windings of the pickups 10, 12, 14 connects to switch means for selecting outputs of the pickups in any one of the following seven combinations or configurations: treble pickup 10 output alone, treble pickup 10 output plus middle pickup 14 output, middle pickup 14 output alone, middle pickup 14 output plus rhythm pickup 12 output, rhythm pickup 12 output alone, treble pickup 10 output plus rhythm pickup 12 output, and treble pickup 10 output plus middle pickup 14 output plus rhythm pickup 12 output. This switch means is implemented in any suitable manner, but in the illustrated embodiment it includes a two-pole five-position switch 16 and a switch 18. The switch 18 is referred to as a mode switch in that it allows selection between either a conventional mode, wherein the basic five pickup configurations available on a conventional STRATOCASTER electric guitar are obtained, or an extended mode position, wherein the additional two pickup configurations can be selected.

The switch 16 has two poles 20, 22 connected to ganged switch contacts 24, 26 which selectably engage terminals of respective terminal sets 28, 30. Three terminals are shown in each of the sets 28, 30; however, there are five positions through which the switch contacts 24, 26 can be moved as noted in FIG. 2 by the numerals 1, 2, 3, 4 and 5. The switch contacts 24, 26 are defined such that in positions 2 and 4, each contact makes contact between the respective terminals 1, 3 in switch position 2 and terminals 3, 5 in switch position 4. In positions 1, 3 and 5, the switch contacts 24, 26 contact only those respective terminals.

Referring to specific terminals, terminal 1 of the terminal set 28 is connected to a terminal 32 of the switch 18. Terminal 3 of the terminal set 30 is connected to the winding of the middle pickup 14, and terminal 5 of the terminal set 30 is connected to the winding of the rhythm pickup 12 as shown in FIG. 2.

The pole 20 of the switch 16 is connected to a terminal 34 of the switch 18. A pole 36 of the switch 18 is connected to the winding of the treble pickup 10 so that the treble pickup 10 is connectable either to terminal 1 of the terminal set 28 or to the pole 20 depending upon the setting of a switch contact 38 of the mode switch 18. This latter connection of the treble pickup 10 to the pole 20 occurs for the position of the switch contact 38 illustrated in FIG. 2.

The pole 20 of the switch 16 is also connected to a volume control means for controlling volume of the output of the treble pickup 10. This connection is specifically to a wiper 40 of a variable resistor 42. The variable resistor 42 is connected between electrical ground and an output illustrated as an output jack 44 of conventional type typically found on an electric guitar.

Another volume control means is provided by a variable resistor 46 having a wiper 48 connected to the pole 22 of the switch 16. The resistor 46 is connected in electrical parallel with the resistor 42. The variable resistor 46 allows for volume control of the outputs of the rhythm pickup 12 and the middle pickup 14.

With the two volume control means of the present invention connected as shown in FIG. 2, the guitar player can selectably blend any treble pickup 10 output with any rhythm pickup 12 output and middle pickup 14 output that are selected by operation of the switches 16, 18. That is, the two volume control means are connected such that a single output comprising a selectable blend of treble pickup output and middle and rhythm pickup outputs is provided from the guitar pickup switching system through the output jack 44.

The preferred embodiment of the guitar pickup switching system shown in FIG. 2 also includes a variable tone control circuit 50 connected in electrical parallel to the two variable resistors 42, 46 of the two volume control means. In the preferred embodiment, one, and only one, such tone control circuit is used. The tone control circuit allows logarithmic variability in tone control whereas the volume control circuits allow linear variability in volume control.

As shown in FIG. 2, the tone control circuit 50 includes a variable resistor-capacitor circuit. The resistor of a specific implementation is part of a unit which also includes the switch 18 embodied as a push-pull switch. When the knob of this unit is pushed in, the switch contact 38 is moved to contact the terminal 32; and when the knob of the unit is pulled out, the switch contact 38 contacts the terminal 34 as shown in FIG. 2. Rotation of the knob adjusts the position of the wiper of the variable resistor of the tone control circuit 50.

The switch 16 of a particular implementation includes a conventional two-pole five-position switch such as used on a FENDER STRATOCASTER electric guitar.

In operation, with the switch contact 38 of the switch 18 in the position shown in FIG. 2, the extended mode is selected in that when the switch contacts 24, 26 of the switch 16 are jointly moved through the five positions of the switch 16, the selected pickup configurations are as follows:

| Switch 16 Position | Pickup Configuration |
|---|---|
| 1 | treble pickup alone |
| 2 | treble pickup plus middle pickup |
| 3 | treble pickup plus middle pickup |
| 4 | treble pickup plus middle pickup plus rhythm pickup |
| 5 | treble pickup plus rhythm pickup |

In each of the foregoing positions, blending can be obtained by controlling the resistors 42, 46. With the resistors 42, 46 connected as shown in FIG. 2, either or both of the signals provided to these resistors can be varied from zero (ground) to maximum (at the opposite end of the respective resistor 42, 46). Thus, for example, in position 2 or 3 above, either the treble pickup output or the middle pickup output can be totally removed by either the resistor 42 or the resistor 46, respectively, with any remaining signal being provided to the output jack 44. Any blend of these two outputs can also be obtained by appropriately adjusting the respective resistors 42, 46.

When the switch 18 is in the conventional mode position with the switch contact 38 switched between the pole 36 and the terminal 32, the following table shows the selectable pickup configurations which are the same as in a conventional STRATOCASTER electric guitar switching system:

| Switch 16 Position | Pickup Configuration |
|---|---|
| 1 | treble pickup alone |
| 2 | treble pickup plus middle pickup |
| 3 | middle pickup alone |
| 4 | middle pickup plus rhythm pickup |
| 5 | rhythm pickup alone |

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A guitar pickup switching system, comprising:

a single-coil treble pickup;

a single-coil middle pickup;

a single-coil rhythm pickup; and switch means for selecting outputs of said pickups in any one of the following seven combinations: treble pickup output alone, treble pickup output plus middle pickup output, middle pickup output alone, middle pickup output plus rhythm pickup output, rhythm pickup output alone, treble pickup output plus rhythm pickup output, and treble pickup output plus middle pickup output plus rhythm pickup output.

2. A guitar pickup switching system as defined in claim 1, further comprising:

first volume control means for controlling volume of the output of said treble pickup; and second volume control means for controlling volume of the outputs of said middle pickup and said rhythm pickup, said first and second volume control means connected such that a single output comprising a selectable blend of treble pickup output and middle and rhythm pickup outputs is provided from said guitar pickup switching system.

3. A guitar pickup switching system as defined in claim 2, wherein said switch means includes:

a first switch having a first pole connected to said first volume control means and having a second pole connected to said second volume control means; and a second switch connected to said first volume control means.

4. A guitar pickup switching system as defined in claim 3, wherein:

said first volume control means includes a first variable resistor having a wiper connected to said first pole of said first switch and to said second switch; and said second volume control means includes a second variable resistor connected in electrical parallel to said first variable resistor and having a wiper connected to said second pole of said first switch.

5. A guitar pickup switching system as defined in claim 4, further comprising one, and only one, tone control circuit connected in electrical parallel to said first and second variable resistors.

6. A guitar pickup switching system, comprising:

a single-coil treble pickup;

a single-coil middle pickup;

a single-coil rhythm pickup;

first volume control means for controlling volume of the output of said treble pickup; and second volume control means for controlling volume of the outputs of said middle pickup and said rhythm pickup, said first and second volume control means connected such that a single output comprising a selectable blend of treble pickup output and middle and rhythm pickup outputs is provided from said guitar pickup switching system.

7. A guitar pickup switching system as defined in claim 6, wherein:

said first volume control means includes a first variable resistor having a wiper selectably connectable to said treble pickup; and said second volume control means includes a second variable resistor connected in electrical parallel to said first variable resistor and having a wiper selectably connectable to said middle pickup and said rhythm pickup.

8. A guitar pickup switching system as defined in claim 7, further comprising a tone control circuit connected in electrical parallel to said first and second variable resistors.

9. A guitar pickup switching system, comprising:

a single-coil treble pickup;

a single-coil middle pickup;

a single-coil rhythm pickup;

a two-pole five-position switch having a terminal, associated with a first pole; and said switch having another terminal, associated with a second pole and connected to said middle pickup; and said switch having a further terminal, associated with said second pole and connected to said rhythm pickup; and a mode control switch having a pole connected to said treble pickup and further having a first terminal connected to said terminal of said two-pole five-position switch associated with said first pole thereof; said mode control switch also having a second terminal, said second terminal connected to said first pole of said two-pole five-position switch.

10. A guitar pickup switching system as defined in claim 9, wherein:

said terminal associated with said first pole of said two-pole five-position switch is connected to said first pole in first and second positions of said two-pole five-position switch;

said another terminal, associated with said second pole of said two-pole five-position switch, is connected to said second pole in second, third and fourth positions of said two-pole five-position switch; and said further terminal, associated with said second pole of said two-pole five-position switch, is connected to said second pole in fourth and fifth positions of said two-pole five-position switch.

11. A guitar pickup switching system as defined in claim 10, further comprising:

a first variable resistor having a wiper connected to said first pole of said two-pole five-position switch; and a second variable resistor, having a wiper connected to said second pole of said two-pole five-position switch.

12. A guitar pickup switching system as defined in claim 11, wherein said first and second variable resistors are connected in electrical parallel.

13. A guitar pickup switching system as defined in claim 12, further comprising a variable tone control circuit connected in electrical parallel to said first and second variable resistors.

14. A guitar pickup switching system as defined in claim 9, further comprising:

a first variable resistor having a wiper connected to said first pole of said two-pole five-position switch; and a second variable resistor, having a wiper connected to said second pole of said two-pole five-position switch.

15. A guitar pickup switching system as defined in claim 14, wherein said first and second variable resistors are connected in electrical parallel.

16. A guitar pickup switching system as defined in claim 15, further comprising a variable tone control circuit connected in electrical parallel to said first and second variable resistors.

* * * * *